(12) United States Patent
Hwang et al.

(10) Patent No.: US 8,204,059 B2
(45) Date of Patent: *Jun. 19, 2012

(54) METHOD FOR FORMATTING SIGNAL IN MOBILE COMMUNICATION SYSTEM

(75) Inventors: In Tae Hwang, Kyonggi-do (KR); Sang Rim Shin, Kyonggi-do (KR); Myoung Jin Ok, Seoul (KR)

(73) Assignee: LG Electronics Inc., Seoul (KR)

( * ) Notice: Subject to any disclaimer, the term of this patent is extended or adjusted under 35 U.S.C. 154(b) by 534 days.

This patent is subject to a terminal disclaimer.

(21) Appl. No.: 11/563,641

(22) Filed: Nov. 27, 2006

(65) Prior Publication Data

US 2007/0091931 A1    Apr. 26, 2007

Related U.S. Application Data

(63) Continuation of application No. 10/914,074, filed on Aug. 10, 2004, now Pat. No. 7,545,807, which is a continuation of application No. 09/409,698, filed on Sep. 30, 1999, now Pat. No. 6,791,963.

(30) Foreign Application Priority Data

Oct. 1, 1998 (KR) ..................................... 98-41483

(51) Int. Cl.
*H04L 12/28* (2006.01)

(52) U.S. Cl. .................... 370/392; 370/395.3; 370/397; 370/399; 370/342; 370/409; 370/471; 370/472; 370/473; 370/469

(58) Field of Classification Search .................. 370/389, 370/409, 395.3, 392, 469, 395.1, 397, 399, 370/342, 470–473
See application file for complete search history.

(56) References Cited

U.S. PATENT DOCUMENTS 4,916,660 A    4/1990 Takahashi
(Continued)

FOREIGN PATENT DOCUMENTS

EP    0 482 773 A1    4/1992
(Continued)

OTHER PUBLICATIONS

Roobol C et al: "A proposal for an RLC/MAC protocol for wideband CDMA capable of handling real time and non-real time services" Vehicular Technology Conference, 1998. VTC 98. 48TH IEEE Ottawa, Ont., Canada May 18-21, 1998, New York, NY, USA, IEEE, US, May 18, 1998, pp. 107-111, XP010287797 ISBN: 0-7803-4320-4 *p. 107, right-hand column, paragraphs 3, 4* *p. 110, right-hand column, paragraph 3*.

(Continued)

*Primary Examiner* — Christopher Grey
(74) *Attorney, Agent, or Firm* — Lee, Hong, Degerman, Kang & Waimey

(57) ABSTRACT

A method for formatting a signal in a mobile communication system by appending a plurality of medium access control headers to a plurality of medium access control-service data units for data transfer between a mobile station and network in the mobile communication system. If the service data units have the same characteristics, a medium access control-protocol data unit is formed by successively coupling the service data units to any one of the medium access control headers. If the service data units have different characteristics, the protocol data unit is formed by sequentially coupling each of the service data units and each of the medium access control headers. The formed protocol data unit is then transformed into a transport block with a predetermined size. A medium access control sublayer formats medium access control-protocol data units according to transport channel characteristics in peer-to-peer communication in such a manner that the protocol data units can have different formats with respect to different transport channels. This makes it possible to provide more efficient functions.

9 Claims, 4 Drawing Sheets

U.S. PATENT DOCUMENTS

| | | | |
|---|---|---|---|
| 5,208,811 A | | 5/1993 | Kashio et al. |
| 5,280,476 A | | 1/1994 | Kojima |
| 5,471,474 A | * | 11/1995 | Grobicki et al. ............... 370/437 |
| 5,509,007 A | | 4/1996 | Takashima et al. |
| 5,528,592 A | * | 6/1996 | Schibler et al. ............... 370/397 |
| 5,559,804 A | | 9/1996 | Amada |
| 5,600,629 A | | 2/1997 | Van Daele |
| 5,707,160 A | | 1/1998 | Bowen |
| 5,752,193 A | | 5/1998 | Scholefield |
| 5,930,265 A | * | 7/1999 | Duault et al. ............... 370/473 |
| 5,936,949 A | | 8/1999 | Pasternak et al. |
| 6,084,888 A | * | 7/2000 | Watanabe et al. ............ 370/473 |
| 6,097,707 A | | 8/2000 | Hodzic |
| 6,134,439 A | | 10/2000 | Sipila et al. |
| 6,141,336 A | | 10/2000 | Bauchot |
| 6,151,318 A | | 11/2000 | Woodward et al. |
| 6,226,277 B1 | | 5/2001 | Chuah |
| 6,285,681 B1 | | 9/2001 | Kolze |
| 6,359,904 B1 | | 3/2002 | Hamalainen et al. |
| 6,374,112 B1 | * | 4/2002 | Widegren et al. .......... 455/452.2 |
| 6,393,008 B1 | * | 5/2002 | Cheng et al. ................. 370/338 |
| 6,396,840 B1 | | 5/2002 | Rose et al. |
| 6,434,130 B1 | | 8/2002 | Soininen |
| 6,507,567 B1 | * | 1/2003 | Willars ........................ 370/321 |
| 6,661,796 B1 | * | 12/2003 | Takashima et al. ........ 370/395.1 |
| 6,675,222 B1 | | 1/2004 | Petersen et al. |
| 6,791,963 B1 | * | 9/2004 | Hwang et al. ................. 370/342 |
| 6,931,009 B1 | * | 8/2005 | Agarwal .................... 370/395.1 |
| 6,956,870 B1 | | 10/2005 | Charriere et al. |
| 2002/0024972 A1 | | 2/2002 | Yi et al. |
| 2002/0048281 A1 | | 4/2002 | Yi et al. |
| 2002/0094833 A1 | | 7/2002 | Lieshout et al. |
| 2004/0071138 A1 | * | 4/2004 | Takashima et al. ........... 370/391 |

FOREIGN PATENT DOCUMENTS

| | | |
|---|---|---|
| EP | 0859533 | 8/1998 |
| KR | 1020010027626 | 4/2001 |
| WO | WO 99/09774 | 2/1999 |
| WO | WO 00/54464 | 9/2000 |
| WO | WO 00/60824 | 10/2000 |
| WO | WO 00/62484 | 10/2000 |
| WO | WO 01/11911 | 2/2001 |

OTHER PUBLICATIONS

Mikkonen, J. et al.: "The Magic Wand-functional overview", IEEE Journal on Selected Areas in Communications, Aug. 1998, vol. 16, No. 6, pp. 953-972.

* cited by examiner

METHOD FOR FORMATTING SIGNAL IN MOBILE COMMUNICATION SYSTEM

CROSS-REFERENCE TO RELATED APPLICATIONS

This application is a continuation of U.S. application Ser. No. 10/914,074, filed Aug. 10, 2004, now U.S. Pat. No. 7,545,807 B2, issued Jun. 9, 2009, which is a continuation of U.S. application Ser. No. 09/409,698, filed Sep. 30, 1999, now U.S. Pat. No. 6,791,963, issued Sep. 14, 2004, which pursuant to 35 U.S.C. §119(a), claims the benefit of earlier filing date and right of priority to Korean Application No. 1998-41483, filed Oct. 1, 1998, the contents of which are hereby incorporated by reference herein in their entirety.

BACKGROUND OF THE INVENTION

1. Field of the Invention

The present invention relates in general to a mobile communication system, and more particularly to a method for formatting a signal in a mobile communication system.

2. Description of the Prior Art

A conventional method for formatting a signal in a mobile communication system will hereinafter be described with reference to FIGS. 1a and 1b.

FIG. 1a is a view illustrating a data flow for a non-automatic repeat request (ARQ)-type radio access bearer service to which the conventional signal formatting method is applied, and FIG. 1b is a view illustrating a data flow for an ARQ-type radio access bearer service to which the conventional signal formatting method is applied.

A medium access control (MAC) sublayer of a mobile station utilizes a MAC-protocol data unit (PDU) for peer-to-peer communication with a peer MAC sublayer of a network.

The MAC-PDU contains fields necessary to the execution of a MAC function.

In radio link control-user/control plane (RLC-U/C) layers, data transferred from upper layers is segmented into payload units (PUs) and then reassembled.

The PU is defined as a unit for the resending of an ARQ-type service, and it is dimensioned to be suitable to the lowest data rate in connection.

The RLC-U/C layers append headers for segmentation information and acknowledgment information respectively to the PUs and transfer the resultant RLC-U/C PDUs to the MAC sublayer.

The MAC sublayer, in turn, appends information multiplexing headers respectively to the RLC-U/C PDUs from the RLC-U/C layers and produces the resultant MAC-PDUs.

The MAC-PDU has a size corresponding to that of a transport block to a layer 1.

On the other hand, a non-ARQ-type variable rate service, the MAC-PDU is mapped into a transport block to be transferred to the layer 1, the size of which is variable.

As a result, in the non-ARQ-type variable rate service, the MAC-PDU is variable in size. As shown in FIG. 1a, the MAC-PDU includes a plurality of MAC-service data units (SDUs).

In an ARQ-type fixed rate service, the MAC-PDU is determined in size according to the size of a transport block where the PU is fixed in size. As a result, the MAC-PDU includes only one MAC-SDU, as shown in FIG. 1b.

As shown in FIG. 1a, a physical layer transforms one multiplexing header and one MAC-SDU or one multiplexing header and a plurality of MAC-SDUs from the MAC sublayer into a transport block with a predetermined size. Also, as shown in FIG. 1b, the physical layer transforms one multiplexing header and one MAC-SDU from the MAC sublayer into a transport block with a predetermined size. Then, the physical layer sends the resultant transport block to the network through a physical channel.

Upon receiving the transport block sent from the mobile station through the physical channel, the network performs the opposite procedure to that of the mobile station to separate the received transport block into one MAC header and one or more MAC-SDUs and perform the associated signal processing.

SUMMARY OF THE INVENTION

Therefore, the present invention has been made for the effective implementation of a medium access control sublayer function, and it is an object of the present invention to provide a method for formatting a signal in a mobile communication system, in which a medium access control sublayer formats medium access control-protocol data units according to transport channel characteristics in peer-to-peer communication in such a manner that the protocol data units can have different formats with respect to different transport channels.

In accordance with one aspect of the present invention, the above and other objects can be accomplished by a provision of a method for formatting a signal in a mobile communication system by appending a plurality of medium access control headers to a plurality of medium access control-service data units for data transfer between a mobile station and network in the mobile communication system, comprising the first step of, if the service data units have the same characteristics, forming a medium access control-protocol data unit by successively coupling the service data units to any one of the medium access control headers; and the second step of transforming the formed protocol data unit into a transport block with a predetermined size.

Preferably, the protocol data unit may include a plurality of fill bits.

Further, preferably, each of the medium access control headers may include a mobile identifier region for in-band identification; a medium access control-service access point identifier region for multiplexing a logical channel for service data with a corresponding one of the medium access control headers; a radio link control-user plane identifier region for multiplexing a radio link control-user entity; a medium access control-service data unit length region and a medium access control-service data unit extension region or a medium access control-service data unit number region for cooperating to send the service data; and a frame format identifier region for transfer of information to a higher layer and contention resolution.

Further, preferably, the frame format identifier region may include an information format for transferring the information to the higher layer; and a command format or a response format for the contention resolution.

In accordance with another aspect of the present invention, there is provided a method for formatting a signal in a mobile communication system by appending a plurality of medium access control headers to a plurality of medium access control-service data units for data transfer between a mobile station and network in the mobile communication system, comprising the first step of, if the service data units have different characteristics, forming a medium access control-protocol data unit by sequentially coupling each of the service data units and each of the medium access control headers; and the second step of transforming the formed protocol data unit into a transport block with a predetermined size.

Preferably, the first step may include the step of sequentially forming the medium access control headers and then appending each of the service data units to a corresponding one of the medium access control headers subsequently thereto.

In accordance with yet another aspect of the present invention, there is provided a method for formatting a signal in a mobile communication system by appending a plurality of medium access control headers to a plurality of medium access control-service data units for data transfer between a mobile station and network in said mobile communication system, comprising the first step of, if said service data units have the same characteristics, forming a medium access control-protocol data unit by successively coupling said service data units to any one of said medium access control headers; the second step of, if said service data units have different characteristics, forming said protocol data unit by sequentially coupling each of said service data units and each of said medium access control headers; and the third step of transforming the formed protocol data unit into a transport block with a predetermined size.

In a feature of the present invention, a medium access control sublayer formats medium access control-protocol data units according to transport channel characteristics in peer-to-peer communication in such a manner that the protocol data units can have different formats with respect to different transport channels. This makes it possible to provide more efficient functions.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

A method for formatting a signal in a mobile communication system in accordance with the preferred embodiment of the present invention will hereinafter be described with reference to FIGS. 2 and 3.

Figure 2:
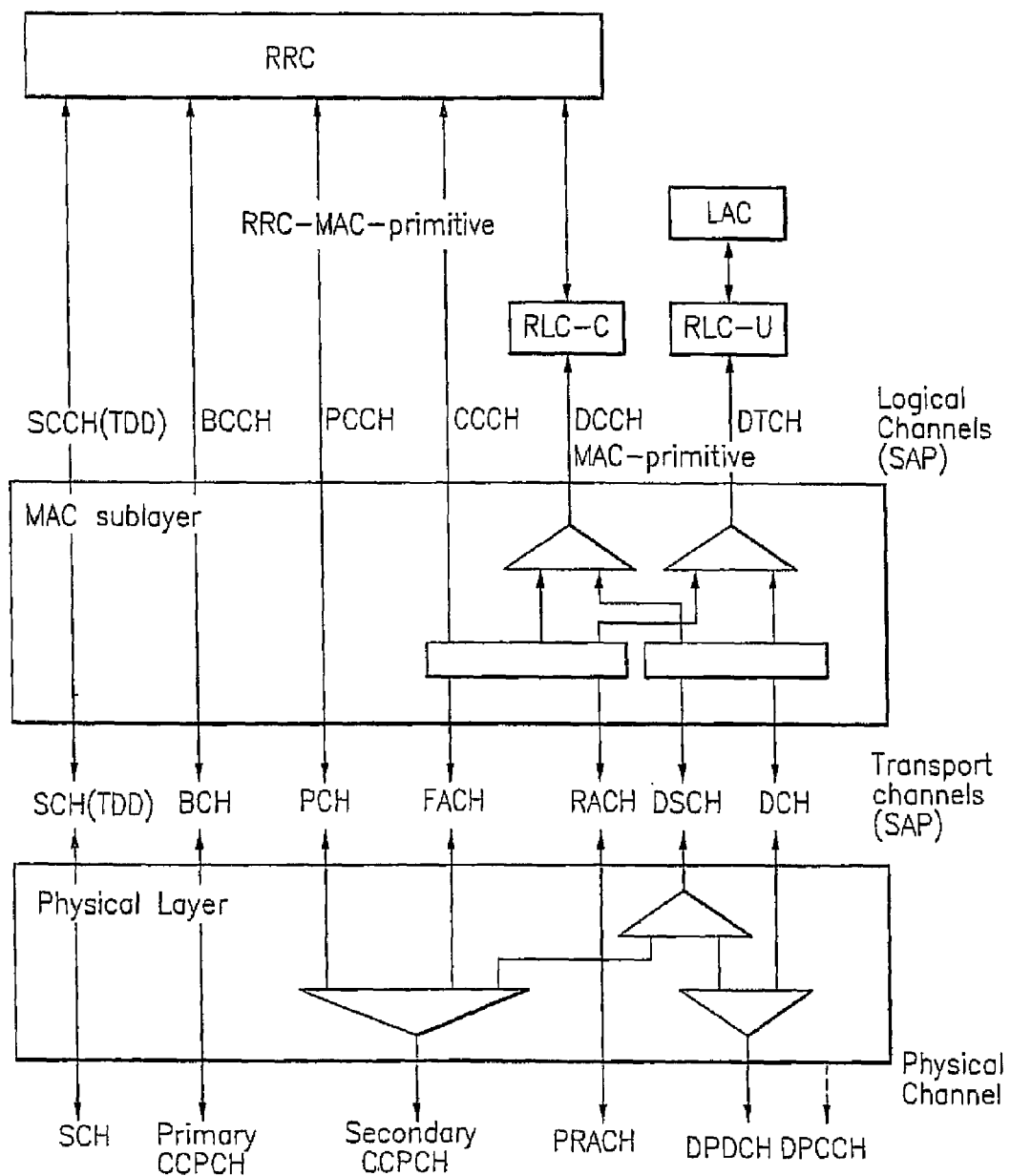
FIG. 2 is a view illustrating a data flow based on a method for formatting a signal in a mobile communication system in accordance with the preferred embodiment of the present invention.
Figure 3:
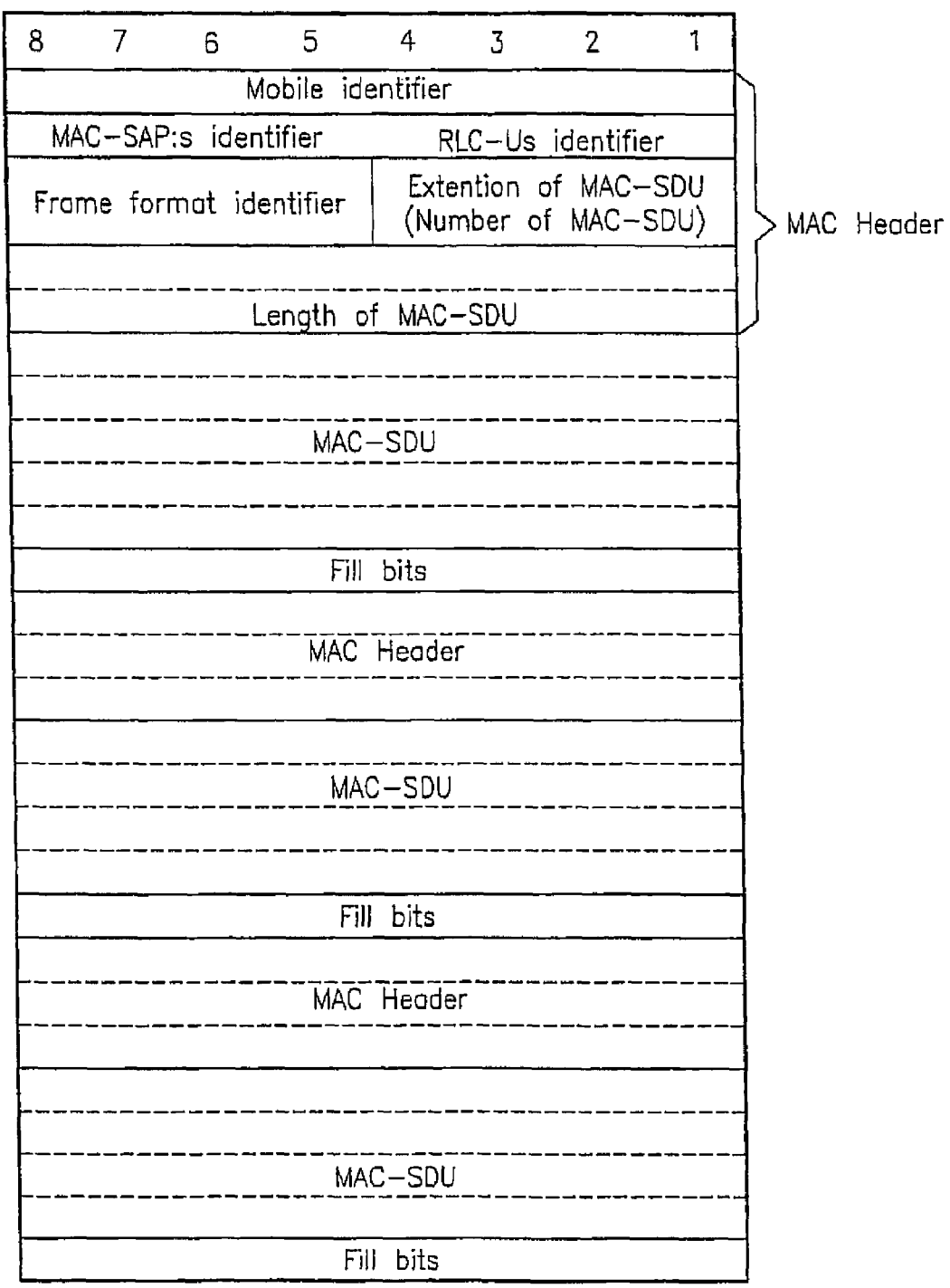
FIG. 3 is a view showing a header format based on the signal formatting method in accordance with the preferred embodiment of the present invention.

FIG. 2 is a view illustrating a data flow based on the signal formatting method in accordance with the preferred embodiment of the present invention, and FIG. 3 is a view showing a header format based on the signal formatting method in accordance with the preferred embodiment of the present, invention.

In peer-to-peer communication between a mobile station and a network in a mobile communication system, first, an upper layer, or a radio resource control (RRC) layer, of the mobile station transfers data to a MAC sublayer through logical channels, or a synchronization control channel (SCCH) (time division duplexer (TDD)), a broadcast control channel (BCCH), a paging control channel (PCCH) and a common control channel (CCCH), and service access points (SAPs), as shown in FIG. 2.

An RLC-C layer of the mobile station transfers service data from the RRC layer to the MAC sublayer through a logical channel, or a dedicated control channel (DCCH), and an SAP.

An RLC-U layer of the mobile station transfers service data from a link access control (LAC) layer to the MAC sublayer through a logical channel, or a dedicated traffic channel (DTCH), and an SAP.

Figure 1A:
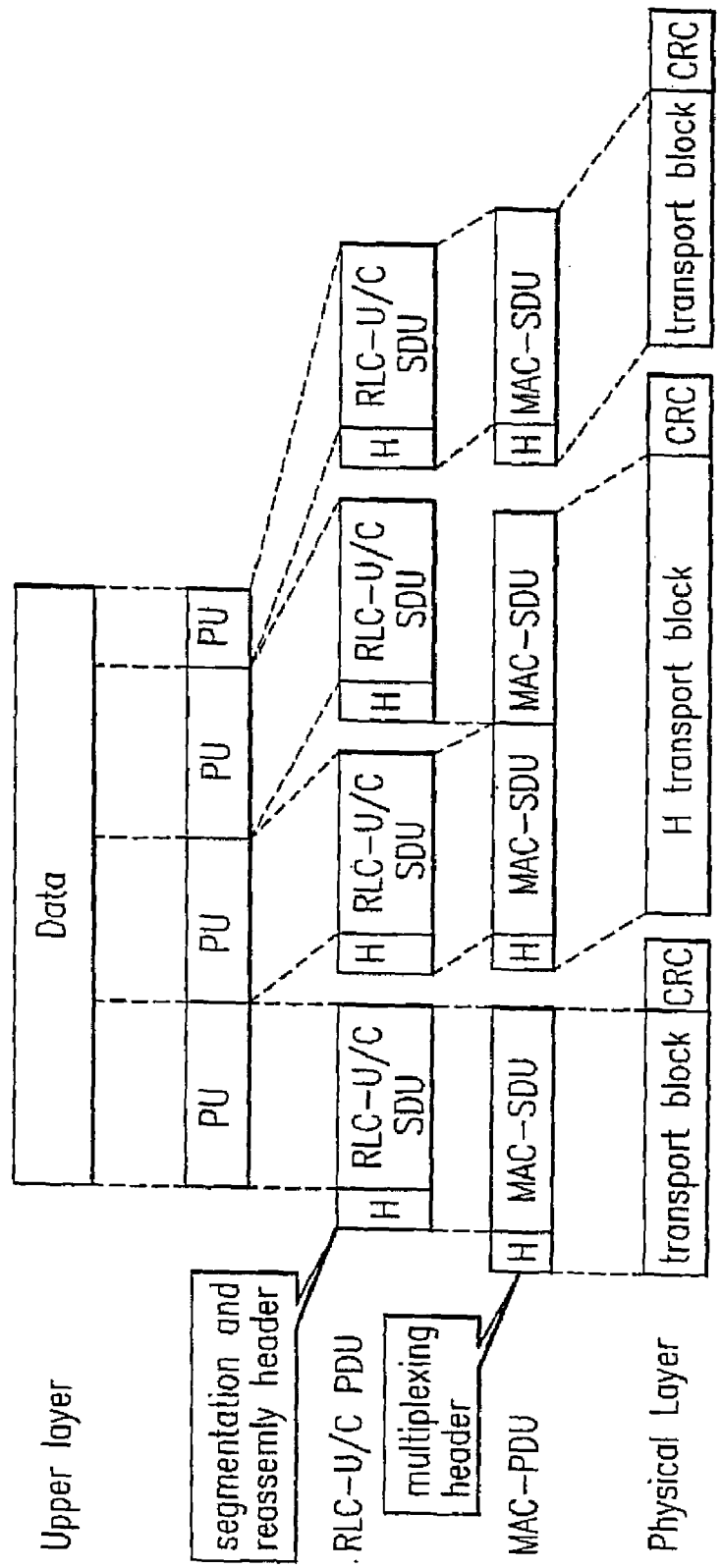
FIG. 1a is a view illustrating a data flow for a non-ARQ-type radio access bearer service to which a conventional method for formatting a signal in a mobile communication system is applied.
Figure 1B:
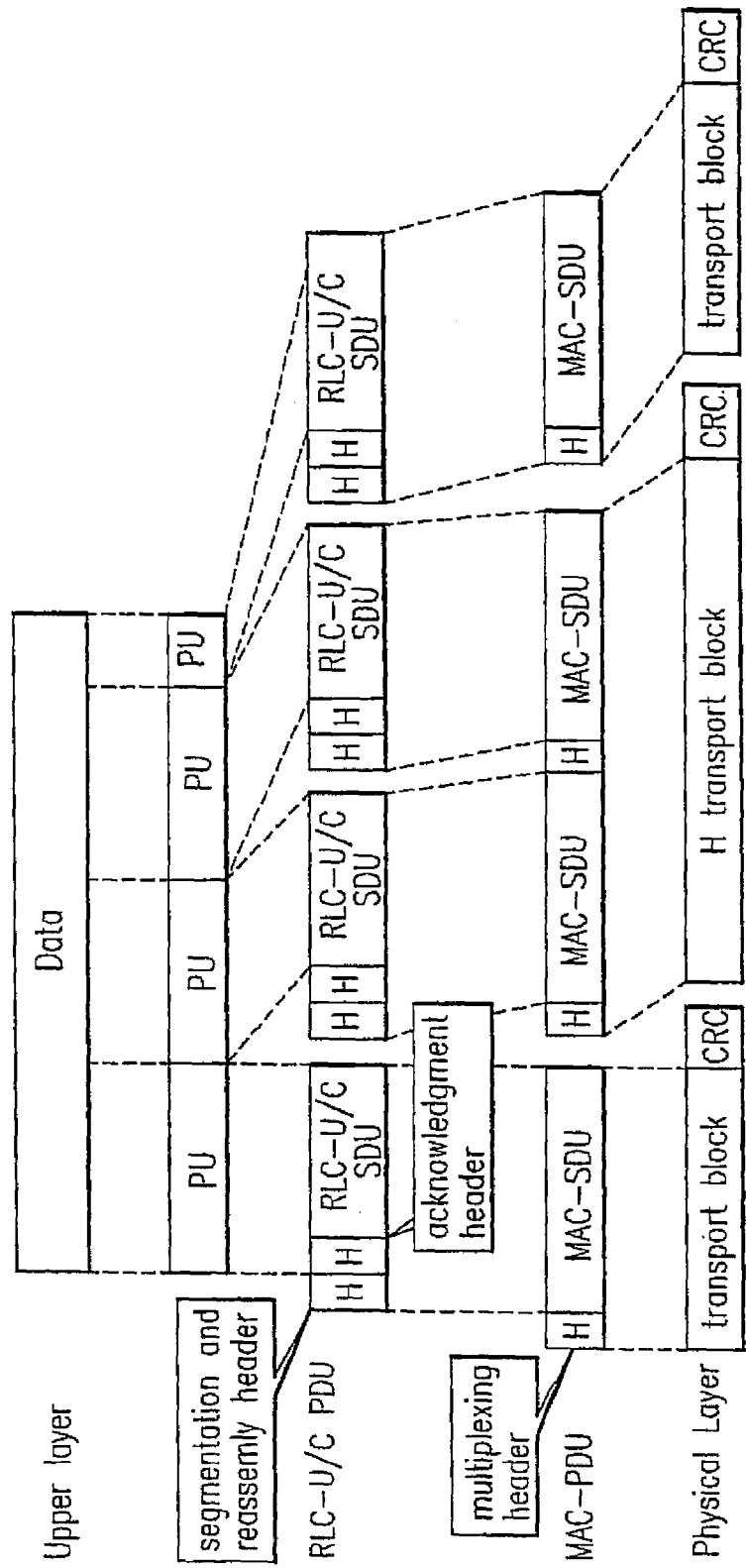
FIG. 1b is a view illustrating a data flow for an ARQ-type radio access bearer service to which the conventional signal formatting method is applied.

As stated previously with reference to FIGS. 1a and 1b, the RLC-U/C layers receive service data composed of a plurality of PUs through the associated logical channels and SAPs and append segmentation and reassembly headers respectively to the received service data to segment it into parts of a size suitable to a sending rate and reassemble the segmented parts. Then, the RLC-U/C layers transfer the resultant RLC-U/C PDUs to the MAC sublayer. The MAC sublayer appends multiplexing headers respectively to the RLC-U/C PDUs from the RLC-U/C layers to multiplex them to transport channels and produces the resultant MAC-PDUs.

The MAC-PDU is composed of a MAC header, a MAC-SDU and fill bits, which are used to fit the size of a transport block. The MAC-PDU may have a plurality of MAC-SDUs in a non-ARQ-type service. The following tables 1, 2a and 2b show MAC-PDU formats in the non-ARQ-type service.

TABLE 1

| MAC header | MAC-SDU | MAC-SDU | MAC-SDU | Fill bits |
|---|---|---|---|---|

TABLE 2a

| MAC header | MAC header | MAC header | MAC-SDU | MAC-SDU | MAC-SDU |
|---|---|---|---|---|---|

TABLE 2b

| MAC header | MAC-SDU | MAC header | MAC-SDU | MAC header | MAC-SDU |
|---|---|---|---|---|---|

In an ARQ-type service, the MAC-PDU includes only one MAC-SDU and only one MAC header.

In the non-ARQ-type service, the transport block is variable in size because the data rate is variable, too.

The PU has a size corresponding to that of the smallest transport block, and a plurality of MAC-SDUs and a plurality of MAC headers may be present in one MAC-PDU.

The above table 1 shows that one MAC-PDU contains only-one MAC header. Here, the MAC header may be either fixed or not in size, and all MAC-SDUs in the MAC-PDU are limited to have the same characteristics.

However, the presence of a plurality of MAC-SDUs in the above table 1 makes it possible to minimize overhead radio.

The above tables 2a and 2b show that MAC headers are present for a plurality of MAC-SDUs in one MAC-PDU, respectively. Here, each of the MAC headers may be either fixed or not in size, and the MAC-SDUs in the MAC-PDU have different characteristics such as, for example, different MAC-SAPs.

TABLE 3

| PDU field | | Functions (Services) associated | Transport Channels | | | | |
|---|---|---|---|---|---|---|---|
| | | | BCH | PCH | FACH/RACH | DSCH | DCH |
| MAC header | Mobile identifier | In-band identification | | | ○ | | ○ |
| | MAC-SAPs identifier | Multiplexing logical channels | | | • | • | • |
| | RLC-Us identifier | Multiplexing multiple RLC-Us | | | • | • | • |
| | Length of MAC-SDU | Data transfer | • | • | • | • | • |
| | Extension of MAC-SDU (Number of MAC-SDU) | Data transfer | • | • | • | • | • |
| | Frame format identifier | Contention resolution | • | • | • | • | • |
| MAC-SDU | | Data transfer | • | • | • | • | • |
| Fill bits | | Fitting the transport block size | • | • | • | • | • |

As stated above, the MAC-PDU is composed of a MAC header, a MAC-PDU and fill bits. As seen from the above table 3, the MAC header has different contents according to transport channels.

For example, in-band identification and MAC-SAP identifier functions of the MAC sublayer are not executed in transport channels, or a broadcast channel (BCH) and a paging channel (PCH).

As shown in the above table 3, the MAC header is composed of a plurality of regions, or mobile identifier, MAC-SAPs identifier, RLC-Us identifier, frame format identifier, extension of MAC-SDU (number of MAC-SDU) and length of MAC-SDU regions.

The mobile identifier region is used for in-band identification for a specific mobile station when the specific mobile station is addressed through a common downlink channel or it uses a random access channel. The responsibility for user identification lies with the MAC sublayer. Mobile identification becomes a radio network temporary identity when a RRC connection is present and a random radio network temporary identity when no RRC connection is present.

The MAC-SAPs identifier region is used to demultiplex transport blocks which the MAC sublayer receives from a layer 1 through transport channels, to corresponding MAC-SAPs.

For example, transport blocks received through transport channels, or a downlink shared channel (DSCH) and a dedicated channel (DCH), may be routed to a DCCH-SAP or a DTCH-SAP.

The RLC-Us identifier region indicates that a plurality of RLC-U entities are present for the DTCH-SAP and the MAC sublayer should demultiplex transport blocks transferred from a physical layer respectively to the RLC-U entities. An RLC-U identifier in the MAC-PDU indicates an RLC-U entity to which the MAC-PDU is to be routed.

The MAC-SDU length region indicates that the MAC-SDU is varied in length. The length of the MAC-SDU must definitely be represented.

The MAC-SDU number region (MAC-SDU extension region) is used when the MAC-PDU includes a plurality of MAC-SDUs.

Namely, the MAC-SDU number region indicates that only one. MAC header is used for a plurality of MAC-SDUs as shown in the table 1, and the MAC-SDU extension region indicates whether the subsequent MAC-SDU is present and that each MAC-SDU has an MAC header as shown in the tables 2a and 2b. These regions are not required in a ARQ-type service where a plurality of MAC-SDUs are not present.

The frame format identifier region is composed of three formats, or an information format, a command format and a response format, as seen from the below table 4.

When the MAC sublayer receives an information format, it transfers a MAC-SDU directly to a higher layer entity.

The command format and response format are used for contention resolution.

TABLE 4

| Format Type | Function | MAC-SDU from where |
|---|---|---|
| Information Format | Normal transmission | RLC-U/C PDU from higher layer |
| Command Format | Command requiring the response for contention resolution | RLC-U/C PDU from higher layer |
| Response Format | Response for command | RLC-U/C PDU received from peer MAC entity |

If the MAC sublayer receives a command format contained in a MAC-SDU from a peer entity, then it has to transfer a response format with the same value as that of the received command format to the peer entity.

The BCH, PCH, a forward access channel (FACH), a random access channel (RACH), the DSCH and DCH are transport channels. In the above table 3, "•" represents ones of the transport channels to which the regions of the MAC header are applicable.

FIG. 3 shows a PDU format of the RACH or FACH, which includes all of the regions of the MAC-PDU as mentioned above.

The RACH or FACH can be mapped to a logical channel, or the CCCH, DCCH or DTCH. The MAC-PDU must have an RLC-U identifier and a MAC-SAP identifier. A contention resolution function can be executed through the RACH or FACH.

In this connection, the MAC-PDU includes a frame format identifier. Also, a mobile identifier is included in the MAC-PDU for in-band user identification for the RACH or FACH.

As a result, the MAC sublayer formats a MAC header in the above manner, selects a transport channel according to regions of the resultant MAC header and transforms the MAC header and service data into a transport block with a size receivable by a physical layer. Then, the MAC sublayer sends the resultant transport block to the network through any one of physical channels, or a synchronization channel (SCH), a primary common control physical channel (CCPCH), a secondary CCCH, a physical random access channel (PRACH) and a dedicated physical data channel (DPDCH).

Upon receiving the transport block sent from the mobile station through the physical channel, the network performs the opposite procedure to that of the mobile station to separate the received transport block into one or more MAC headers and a plurality of MAC-SDUs and perform the associated signal processing.

Further, for communication between the network and mobile station in the mobile communication system, the network performs the same procedure as that of the mobile station to format a signal according to a transport channel and send the resultant transport block with a predetermined size through a physical channel. Then, the mobile station receives the transport block sent from the network and performs the opposite procedure to that of the network to separate the received transport block into one or more MAC headers and a plurality of MAC-SDUs and perform the associated signal processing.

As apparent from the above description, according to the present invention, the MAC sublayer formats MAC-PDUs according to transport channel characteristics in peer-to-peer communication in such a manner that the MAC-PDUs can have different formats with respect to different transport channels. Therefore, the present invention has the effect of providing more efficient functions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claims is:

1. A method of receiving a medium access control protocol data unit (MAC-PDU) at a receiving terminal in a communication system, the method comprising:

receiving, at a medium access control (MAC) layer of the receiving terminal, a MAC-PDU which comprises a data region and a header, the data region comprising a plurality of MAC service data units (MAC-SDUs), the header comprising a first identifier which is common to the plurality of MAC-SDUs and a second identifier for identifying a receiver of the MAC PDU, and wherein the header further comprises an extension region which indicates that the data region includes the plurality of MAC-SDUs, wherein the plurality of MAC-SDUs have the same characteristics and wherein the first identifier is used by the MAC layer of the receiving terminal to transfer the plurality of MAC-SDUs to an upper layer of the receiving terminal, and wherein the first identifier is a MAC service access point (MAC-SAP) identifier and is used to demultiplex the plurality of MAC-SDUs to corresponding MAC-SAPs in the upper layer; and delivering the plurality of MAC-SDUs included in the data region to the upper layer of the receiving terminal.

2. The method of claim 1, wherein the MAC-PDU further comprises a 'Fill bits' region which is used for a transmission block size of the data region.

3. The method of claim 1, wherein the header further comprises a length region providing length information of the data region.

4. The method of claim 1, wherein the extension region indicates the number of the plurality of MAC-SDUs.

5. The method of claim 1, wherein the plurality of MAC-SDUs are delivered between the upper layer and MAC layer in accordance with the first identifier.

6. A receiving terminal for receiving a medium access control protocol data unit (MAC-PDU) in a communication system, the receiving terminal comprising:

a medium access control (MAC) layer configured to receive a MAC-PDU which comprises a data region and a header, the data region comprising a plurality of MAC service data units (MAC-SDUs), the header comprising a first identifier which is common to the plurality of MAC-SDUs and a second identifier for identifying a receiver of the MAC PDU, and wherein the header further comprises an extension region which indicates that the data region includes the plurality of MAC-SDUs, wherein the plurality of MAC-SDUs have the same characteristics, wherein the first identifier is used by the MAC layer of the receiving terminal to transfer the plurality of MAC-SDUs to an upper layer of the receiving terminal and wherein the MAC layer is further configured to deliver the plurality of MAC-SDUs to the upper layer of the receiving terminal, and wherein the first identifier is a MAC service access point (MAC-SAP) identifier and is used to demultiplex the plurality of MAC-SDUs to corresponding MAC-SAPs in the upper layer; and the upper layer configured to receive the plurality of MAC-SDUs from the MAC layer.

7. The receiving terminal of claim 6, wherein the plurality of MAC-SDUs are delivered between the upper layer and MAC layer in accordance with the first identifier.

8. The method of claim 1, wherein the second identifier is a mobile identifier.

9. The receiving terminal of claim 6, wherein the second identifier is a mobile identifier.

* * * * *